UNITED STATES PATENT OFFICE.

FREDERICK EMKEN, OF STAPLETON, NEW YORK.

IMPROVEMENT IN TREATING BEER, &c.

Specification forming part of Letters Patent No. 172,723, dated January 25, 1876; application filed October 29, 1875.

*To all whom it may concern:*

Be it known that I, FREDERICK EMKEN, of Stapleton, in the county of Richmond and State of New York, have invented a new and useful Improvement in Treating Beer and other fermentable liquids, which improvement is fully set forth in the following specification:

This invention consists in treating beer or other fermentable liquids with benzoic acid, either alone, or mixed with bisulphite of soda or other acid salt, such as bisulphite of potash or bisulphate of soda, so that the fermentation of the liquid can be counteracted or controlled, and the acidification of the liquid can be effectually prevented.

In carrying out my invention, I employ, by preference, a mixture of benzoic acid with bisulphite of soda, composed of benzoic acid, four parts; bisulphite of soda, one part; or, instead of bisulphite of soda, any other acid salt may be used which prevents the benzoic acid from combining with the phosphates contained in the beer or other liquid, since the formation of such compounds would prevent the anti-fermenting action of the benzoic acid.

Another advantage of the addition of an acid salt to the benzoic acid is that the cost of the material is thereby considerably reduced, while the effect is improved, for the reason above stated. It must be remarked, however, that the benzoic acid may be employed without the addition of bisulphite or other acid salt.

In order to enable the benzoic acid to produce the desired action, it is essential that the beer or other liquid shall retain an acid reaction. If the beer has already been treated with an excess of bicarbonate of soda, for instance, the effect of the benzoic acid is lost.

By means of the benzoic acid, with or without the addition of an acid salt, I am enabled to control the fermentation of beer or other fermentable liquids with the greatest nicety; and, furthermore, the acidification of such liquids can be effectually prevented.

The quantity of benzoic acid required for producing this action is about as follows: Of the mixture of benzoic acid with bisulphite of soda, as above stated, I use one and one-fifth ounce for thirty-two gallons of beer.

If I employ benzoic acid alone the same quantity of one and one-fifth ounce will be required for the above quantity of beer, and the cost of the material is thereby increased.

What I claim as new, and desire to secure by Letters Patent, is—

The within-described process of treating beer or other fermentable liquids with benzoic acid, either alone or mixed with an acid salt, whereby the fermentation of the beer can be controlled and acidification prevented, substantially as set forth.

In testimony that I claim the foregoing, I have hereunto set my hand and seal this 27th day of October, 1875.

FREDERICK EMKEN. [L. S.]

Witnesses:
 W. HAUFF,
 E. F. KASTENHUBER.